United States Patent

Steckler

[15] 3,641,258

[45] Feb. 8, 1972

[54] SAMPLE-AND-HOLD CIRCUIT

[72] Inventor: Steven Alan Steckler, Clark, N.J.

[73] Assignee: RCA Corporation

[22] Filed: June 29, 1970

[21] Appl. No.: 50,592

[52] U.S. Cl. ............................178/73 R, 307/232, 328/133, 331/36, 329/50

[51] Int. Cl. ......................H03k 5/20, H03b 3/06, H04n 1/36

[58] Field of Search .................178/7.3 S, 7.3 R, 7.5 S, 7.5 R, 178/69.5 TV, 69.5 CB; 307/232, 262, 237; 328/133; 329/50; 325/420, 423; 331/8, 20, 27, 36

[56] References Cited

UNITED STATES PATENTS 2,951,117 8/1960 Malouski............................178/7.3 S

*Primary Examiner*—Robert L. Richardson
*Assistant Examiner*—John C. Martin
*Attorney*—E. M. Whitacre

[57] ABSTRACT

A sample-and-hold circuit employs first and second transistors having serially coupled collector-to-emitter current paths and including a negative feedback path coupling the collector of the first transistor to the base of the second transistor to provide a high-input impedance and a relatively low-output impedance circuit suitable for driving, for example, a capacitive load. The detector is keyed by means of a single keying transistor which provides a conduction path from the collector and the base of the first transistor to ground. Diodes coupled in series with the keying transistor and both the base and the collector of the first transistor insure that the first and second transistors are switched in and out of conduction simultaneously. The circuit may be employed as a phase comparator.

10 Claims, 1 Drawing Figure

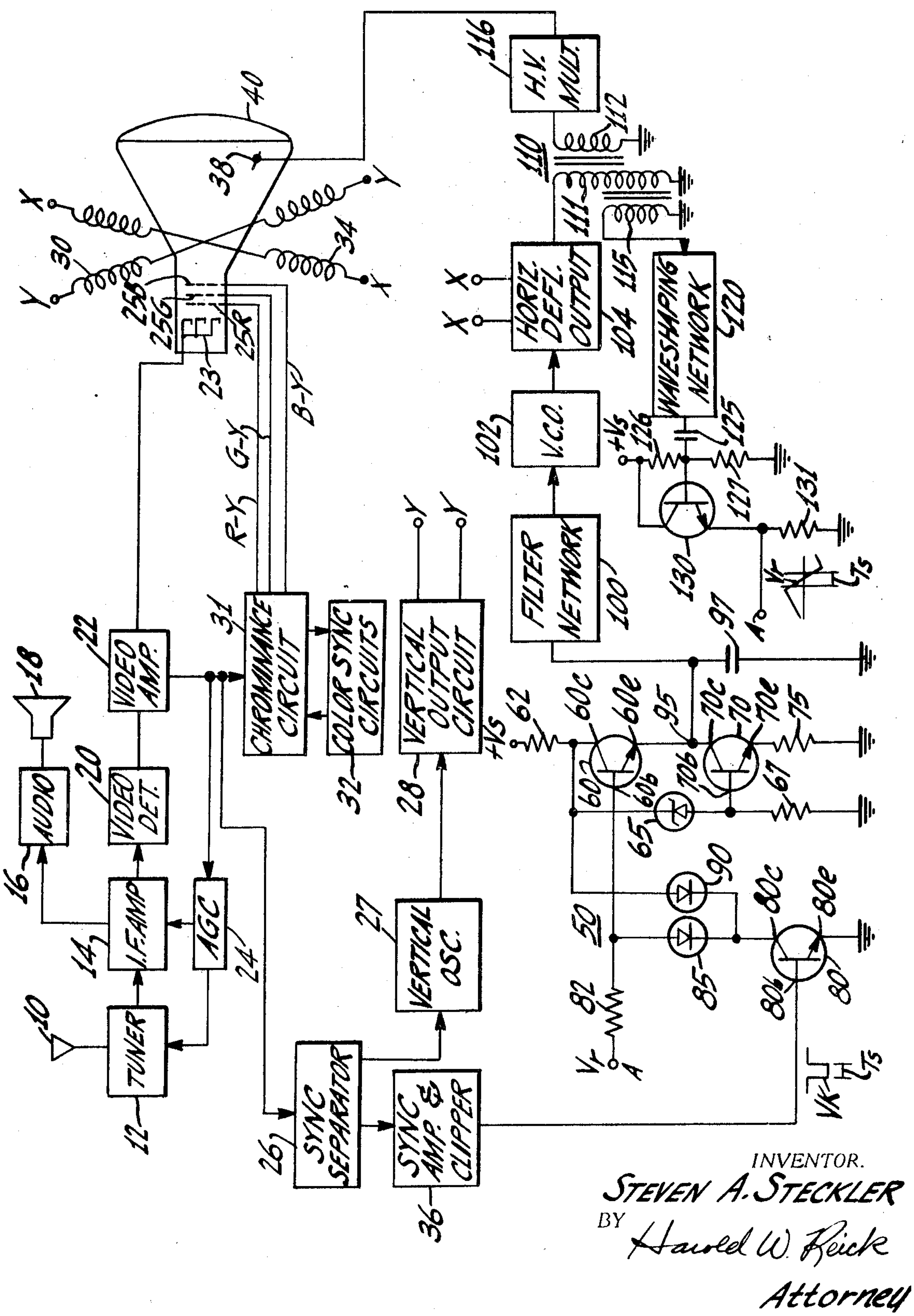
INVENTOR.
STEVEN A. STECKLER
BY Harold W. Reick
Attorney

SAMPLE-AND-HOLD CIRCUIT

The present invention relates to sample-and-hold detectors suitable for use in a circuit which can be employed as a phase comparator in a television receiver.

In television receivers and other electronic apparatus, phase comparators (detectors) are employed to provide an error voltage which is utilized to control the frequency of an oscillator. In a horizontal oscillator in the horizontal deflection system of a television receiver, for example, the phase comparator senses the phase difference between the horizontal oscillator signal and the incoming synchronization signal transmitted by the broadcaster. The output voltage of the phase comparator reflects timing differences between the two sampled signals to provide a corrective output voltage which can be applied to the horizontal oscillator. In many systems, the sampled signals of the horizontal oscillator frequency takes the form of a sawtooth reference voltage waveform which is applied to a keyed phase detector. The detector is essentially an amplifier triggered into conduction by a keying pulse coincident with the arrival of the incoming sync pulse to provide an output voltage only during the sampling interval (i.e., during the sync pulse interval). The output voltage of the keyed detector will depend upon the relative phasings of the sawtooth reference voltage and the keying pulse. This voltage is filtered by a low-pass filter to remove keying frequency components. The phase comparator can be designed so that when the horizontal oscillator frequency is in synchronism with the arriving sync pulses, the sawtooth ramp voltage is crossing its average voltage level at the middle of the sync interval. Thus, when in synchronism, the phase comparator input sees an equivalent amount of negative and positive (relative to the average voltage) sawtooth voltage, and the net filtered output voltage remains unchanged. When the horizontal oscillator is out of synchronism, the reference signal will be laterally displaced in relation to the sampling interval to provide either a net positive or a net negative average change in the output voltage of the phase comparator which serves as an error voltage to correct the horizontal oscillator frequency.

Sample-and-hold detectors are particularly well suited for use as a phase comparator because they present a relatively low-output impedance during the interval when keyed on and a very high-output impedance during the interval when keyed off, thereby permitting storage of the keyed detector output in a reactive component. This type of operation is particularly desirable in integrated circuitry because the restrictions upon power supply voltages severely limits the dynamic range available to the short-duration samples of signal.

A sample-and-hold circuit utilizing serially coupled transistors which are keyed on and off by multiple keying transistors is described in a copending application, Ser. No. 33,336 entitled "Sample-and-Hold Circuit" filed on Apr. 30, 1970 by Allen LeRoy Limberg and assigned to the present assignee.

In the circuit of the above-identified application which employs multiple keying transistors, it is possible that the sample-and-hold circuit will not be keyed in an accurately symmetrical fashion, since the impedances in the collector circuits of the keying transistors are dissimilar. The sample-and-hold transistors may therefore be turned on and off at different times resulting in a slightly asymmetrical sample of the reference signal. In many applications, the accuracy of the earlier circuit is sufficient. In more critical applications, however, the circuitry of the present invention, which provides precise keying of the sample-and-hold circuit, may be necessary.

Circuits embodying the present invention include first and second transistors having serially coupled collector-to-emitter current paths wherein the output signal is taken from the junction of the emitter of the first transistor and the collector of the second transistor. A feedback path couples the collector of the first transistor to the base of the second transistor. The reference signal to be sampled is applied to the base of the first transistor. Keying circuit means provide keying signals which are coupled to a single keying transistor. Unidirectionally conductive devices are coupled between the keying and first transistors to control the turnoff time of the first transistor to match that of the second transistor.

The novel features that are characteristic of the invention are set forth with particularity in the appended claims. The operation of the preferred embodiment of the invention and its advantages will best be understood by referring to the following description together with the sole FIGURE in which there is illustrated partially in block and schematic diagram form, a color television receiver embodying a preferred embodiment of the present invention in a phase comparator circuit.

Referring to the FIGURE, an antenna 10 receives composite television signals and couples these signals to a tuner 12 which selects the desired radio frequency signals of a predetermined broadcast channel, amplifies these signals, and converts the amplified radio frequency signals to a lower intermediate frequency (I.F.) signal. The output of tuner 12 is coupled to an I.F. amplifier 14 which amplifies the I.F. signals. The I.F. amplifier 14 supplies signals to an audio processing circuit 16 which detects audio information, amplifies it, and couples the resultant audio frequencies to a speaker 18 to reproduce the audio portion of the transmitted television program.

Another output of I.F. amplifier 14 is coupled to a video detector stage 20 which derives luminance, chrominance and synchronization information from the intermediate frequency signals. The output of video detector state 20 is coupled to a video amplifier stage 22. Outputs from video amplifier 22 are coupled to an automatic gain control stage 24, a sync separator stage 26 and a chrominance circuit 31. Luminance (Y) signals are coupled from the video amplifier 22 to control elements such as cathodes 23 of a color kinescope 40.

The automatic gain control stage 24 operates in a conventional manner to provide gain control to an R.F. amplifier in tuner 12 and to I.F. amplifier 14. The chrominance circuit 31 operates in conjunction with color synchronization circuits 32 to derive color information signals from the signals supplied by video amplifier 22 and applies these signals to control elements **25*r*, 25*g* and 25*b* of color kinescope 40 to reproduce a color image when color information is being transmitted. Keying pulses for the color synchronization circuits 32** can be supplied from a winding on the horizontal output transformer (not shown).

Sync separator stage 26 separates synchronization information from the video information and also separates the horizontal synchronization information from the vertical synchronization information. The vertical synchronizing pulses are coupled to a vertical oscillator 27 which provides vertical frequency signals which are applied to a vertical output circuit 28. Output stage 28 responds to these signals to provide deflection current by means of terminals Y—Y to a vertical deflection winding 30 associated with kinescope 40. Horizontal synchronizing pulses from sync separator 26 are coupled to a sync amplifier and clipper stage 36. The output from stage 36 supplies negative going sync pulses of approximately 5 microseconds width to a phase comparator stage 50. These signals serves as keying pulses for the comparator. During the remaining portion of each cycle of operation, the output signal from stage 36 conditions transistor 80 to conduct.

Input power is supplied to stage 50 by means of a power supply, illustrated as $V_s$ in the FIGURE, coupled to a collector terminal **60*c* of a first transistor 60 by means of a collector resistor 62. Transistor 60 is further coupled by means of an emitter terminal 60*e* to a collector terminal 70*c* of a second transistor 70. An emitter terminal 70*e* of second transistor 70 is coupled by means of a resistor 75 to a reference potential such as ground. A feedback path couples terminal 60*c* of transistor 60 to a base terminal 70*b* of transistor 70 and includes a direct current voltage translation and an alternating current coupling device such as an avalanche diode 65. A resistor 67 is coupled from the base 70*b* of transistor 70** to ground.

An input signal, derived as explained below, is represented by $V_r$ in the diagram, and is applied to base terminal 60*b* of first transistor 60 by means of an input resistor 82 and a terminal A. A keying transistor 80 receives keying signals from stage 36 as illustrated by the waveform diagram adjacent transistor 80 in the figure and accompanied by the symbol $V_k$. These keying signals are applied to base terminal 80*b* of keying transistor 80. Emitter terminal 80*e* of transistor 80 is coupled to ground. A collector terminal 80*c* of transistor 80 is coupled to the base terminal 60*b* of first transistor 60 by means of a first diode 85. Collector terminal 80*c* is further coupled to the collector terminal 60*c* of transistor 60 by means of a second diode 90. An output terminal 95, at the junction of emitter terminal 60*e* of transistor 60 and collector terminal 70*c* of transistor 70, has a capacitor 97, commonly referred to as the hold capacitor, coupled from the terminal to ground. The charge on capacitor 97 determines the error voltage which is coupled to a voltage controlled oscillator 102 by means of a filter network 100 which serves to remove the keying frequency components. It is noted that capacitor 97 may be incorporated into filter network 100. Also a current limiting resistor (not shown) may be inserted between output terminal 95 and capacitor 97.

The oscillator 102 develops horizontal frequency signals and responds to changes in the applied control voltage to maintain the desired operating frequency (i.e., 15,734 Hz.). The output of oscillator 102 is coupled to a horizontal deflection output stage 104 which develops the horizontal deflection current and couples this current to the horizontal deflection winding 34 associated with kinescope 40 by means of terminals X—X in the FIGURE. In addition, the output stage 104 provides energy to a horizontal output transformer 110 to develop the high-voltage supply required for kinescope 40. Transformer 110 includes a primary winding 111 coupled to the horizontal deflection output stage 104.

A secondary winding 112 provides relatively high-voltage pulses to a high-voltage multiplier circuit 116. The multiplier steps up the incoming voltage to the desired level (i.e., 27 K.V.) and couples the stepped up voltage to the kinescope by means of a terminal 38. An additional secondary winding 115 associated with transformer 110 develops horizontal frequency pulses which are coupled to a waveshaping network 120 to produce a generally sawtooth shaped voltage waveform. Waveshaping network 120 may include, for example, an integrating network of conventional design well known in the art. The output signal of network 120 is coupled by a capacitor 125 to an emitter follower stage including a transistor 130. A voltage divider comprising serially coupled resistors 126 and 127 is coupled from a source of direct voltage ($+V_s$) to ground. The resistors are chosen to provide a preselected direct voltage level across emitter resistor 131 in the emitter circuit of transistor 130 which is coupled by means of interconnected terminals A and resistor 82 and serves as the collector supply for transistor 80. The resultant output signal at terminal A is illustrated by the waveform accompanied by the symbol $V_r$ shown adjacent to the terminal, and is a generally sawtooth shaped waveform superimposed upon the preselected direct voltage level.

In operation, the sample-and-hold amplifier comprising transistors 60 and 70 does not conduct during the hold mode. This is achieved by keying transistor 80 into saturation during the interval between sync pulses with the $V_k$ signal. The collector terminal 60*c* and base terminal 60*b* of transistor 60 are held at nearly the same potential which is approximately equal to the forward voltage drop across diodes 27 and 29, since the saturation voltage of transistor 80 is nearly zero. Thus, transistor 60 is turned off, since the voltage stored across capacitor 97 holds the emitter 60*e* at a more positive voltage than the base 60*b*. The base terminal 70*b* of transistor 70, being coupled to collector 60*c* of transistor 60 by means of diode 65, is also biased into its cutoff region. With transistors 60 and 70 nonconducting, the output voltage across capacitor 97 remains at a quiescent state depending upon its existent charge, since the time constant of filter network 100 is relatively long with respect to the hold interval (i.e., approximately 58 microseconds).

When it is desired to sample the incoming reference voltage $V_r$ present at terminal A, for example, during the horizontal sync pulse interval a negative keying pulse is a negative keying pulse is applied to the base terminal 80*b* of transistor 80. Transistor 80 responds to the keying pulse during the sample interval (represented by $T_s$ on waveforms $V_k$ and $V_r$) to become nonconductive, thereby removing the conduction path from collector 60*c* and base 60*b* of transistor 60 to ground. As transistor 80 is turned off, its collector voltage rises in a positive direction, thereby decreasing the conduction through diodes 85 and 90. As current through diode 90 decreases, the voltage drop across resistor 62 decreases, thereby causing an increase of voltage of collector terminal 60*c* of transistor 60. This increased voltage is coupled to the base terminal 70*b* of transistor 70 by means of diode 65 and tends to turn transistor 70 on. Also, as the collector voltage on transistor 80 rises, the voltage at the base terminal 60*b* of transistor 60 increases turning on transistor 60.

During the sampling interval $T_s$, the first and second transistors 60 and 70 respectively conduct to operate as an amplifier in the following manner. As the input reference voltage $V_r$ swings positive, transistor 60 is more forward biased and tends to increase its conduction. Simultaneously, the base of transistor 70 receives a negative going signal from the collector of transistor 60 by means of the feedback path including avalanche diode 65 and therefore decreases its conduction. The net change in output current from terminal 95 which flows into capacitor 97 is in a direction to increase the charge on the capacitor so that the voltage at the junction becomes more positive.

As the reference voltage $V_r$ swings negative, transistor 60 tends to conduct a lesser amount, whereas the signal coupled to the base 70*b* of transistor 70 be means of diode 65 changes in a positive direction which causes transistor 70 to increase in conduction. The net change in output current from terminal 95 is thereby in a direction to discharge capacitor 97 and lower the output voltage. Thus, as the input reference voltage $V_r$ goes positive, the output voltage across capacitor 97 tends to increase with the increasing charging current from terminal 95; and as $V_r$ decreases, capacitor 97 discharges, thereby decreasing the output voltage.

If the oscillator is in synchronism with the incoming horizontal sync pulses, the center of the keying pulse $V_k$ may, for example, be aligned with the sawtooth reference signal $V_r$ such that equal positive and negative areas (with respect to the direct voltage level present on $V_i$) are presented to the comparator 50. This condition is illustrated by the waveforms in the FIGURE. When the oscillator is out of synchronism, however, the input $V_r$ is laterally displaced relative to $V_k$ and presents a net positive or negative average signal to comparator 50 while in the sampling mode of operation.

At the end of the sampling interval, the keying signal swings in a positive direction to drive transistor 80 into conduction. It should be noted that when transistors 60 and 70 are in their nonconducting stage, both bases are at a relatively high impedance. When these transistors are conducting, however, (such as during the sampling interval $T_s$), the base of transistor 70 is in the negative feedback loop and therefore at a lower impedance than is the base of transistor 60, therefore, making transistor 70 somewhat slower in responding to a turn off signal applied to base terminal 70*b* than is transistor 60. As transistor 80 is rendered conductive by the signal $V_k$ at the end of the sample interval, diode 90 will be forward biased into conduction by the collector voltage on transistor 60. Since the collector voltage is higher than the average voltage level of the reference signal $V_r$, diode 85 will not be conductive since the collector terminal 80*c* of transistor 80 is held sufficiently high to reverse bias diode 85 because transistor 80 does not saturate immediately. As the collector current in transistor 80 tends to saturate, the increased current flowing through diode 90 produces a voltage drop across resistor 62 which reduces the collector voltage on transistor 60. As this voltage is reduced, the base terminal **70*b* also has a reduced voltage applied by means of the feedback path including avalanche diode 65 which tends to turn it off. As the voltage at terminal 60*c* reaches the base voltage at terminal 60*b*, diode 85 is rendered conductive which then pulls the base voltage at terminal 60*b* down to the value of the collector voltage at terminal 80*c* plus the forward voltage drop across diode 85. By utilizing diodes 85 and 90, it is possible to turn off transistors 60 and 70 simultaneously. Since the base of transistor 70 is at a lower impedance due to the negative feedback loop than is the base of transistor 60, transistor 70 is less responsive to a keying signal, and therefore more difficult to turn off. Without the diode arrangement, the pulling down of the base voltage of transistor 60 would have a tendency to turn this transistor off prematurely and thereby result in nonsymmetrical operation. By reducing the collector voltage of transistor 60 which also tends to reduce the base voltage on transistor 60 which also tends to reduce the base voltage on transistor 70 first, and then pulling down the base of transistor 60 by switching diode 85 into conduction, transistors 60 and 70 are turned off simultaneously. The diode arrangement insures that the base 60*b* of transistor 60 will not be pulled down faster than the base 70*b* of transistor 70**.

Input resistor 82 limits the collector current of transistor 80 when in saturation. Resistor 75 is a degeneration resistor used to stabilize the amplifier. Resistor 67 provides a current path from the collector **60*c* of transistor 60 to ground through avalanche diode 65**, and is utilized to bias the diode in the avalanche operating mode.

The following parameter values have been utilized in a preferred embodiment which was constructed on a monolithic integrated circuit chip:

| | | |
|---|---|---|
| $V_s$ | | +10.5 DC |
| $V_r$ | | 2 v. p—p sawtooth from +2.5 to +4.5 v. |
| $V_k$ | | positive to turn on transistor 80, zero to turn off transistor 80 |
| Diode | 65 | 5.6 v. avalanche diode |
| Resistors | 62 | 3,900 ohms |
| | 67 | 3,000 ohms |
| | 75 | 390 ohms |
| | 82 | 6,200 ohms |

Transistors 60, 70 and 80 are of the NPN-type and of conventional construction.

Diodes 85, 90 are constructed in the same manner as the transistors but have the collector and base terminals interconnected to form diodes.

What is claimed is:

1. A sample-and-hold circuit comprising:
first and second transistors each having base, collector and emitter terminals, and having the collector-to-emitter current paths serially coupled from a source of supply voltage to ground,
means for applying a signal to be sampled to said base terminal of said first transistor,
a feedback path coupling signal frequencies from said collector terminal on said first transistor to said base terminal on said second transistor,
a keying transistor having base, collector and emitter terminals,
a first unidirectional conductive device coupled from said base terminal of said first transistor to said collector terminal of said keying transistor,
a second unidirectional conductive device coupled from said collector terminal on said first transistor to said collector terminal on said keying transistor, said first and second unidirectional conductive devices poled to conduct collector current in said keying transistor,
input keying means for applying a keying signal to said base terminal of said keying transistor, and
circuit means for extracting an output signal from the junction of said emitter terminal on said first transistor and said collector terminal on said second transistor.

2. A circuit as defined in claim 1 wherein said unidirectional conductive devices are diodes.

3. A circuit as defined in claim 1 wherein said signal to be sampled comprises a signal representative of the frequency of a controlled oscillator.

4. A circuit as defined in claim 3 wherein said keying signal is representative of the desired operating frequency of said controllable oscillator.

5. A circuit as defined in claim 4 wherein said circuit means for extracting an output signal includes charge storage means.

6. A circuit as defined in claim 5 wherein said circuit means further includes a filter network for removing keying frequency components from said output signal.

7. A sample and hold circuit comprising
first and second transistors having serially coupled collector-to-emitter current paths, and including a feedback path from a collector terminal of said first transistor to a base terminal of said second transistor, and
a circuit for keying said first and second transistors into and out of conduction to define sample and hold intervals comprising
a source of keying signals timed to define said sample interval,
first and second unidirectional conductive devices, said first device being coupled from said keying signal source to a base terminal of said first transistor, said second device being coupled from said keying signal source to a collector terminal of said first transistor, said devices being poled to conduct in response to said keying signals in a manner to drive said first and second transistors into and out of conduction substantially simultaneously in response to said keying signals.

8. A sample and hold circuit according to claim 7 wherein:
said feedback path is direct current coupled from said collector of said first transistor to the base of said second transistor to provide negative feedback thereto said first and second transistors being of like-type conductivity, and
said collector of said first transistor is coupled to a source of operating voltage by means of a direct current impedance.

9. In a television receiver, a phase comparator for developing a control signal utilized to lock a horizontal oscillator to the incoming horizontal synchronization pulse frequency, said phase comparator comprising:
first and second transistors having base, collector, and emitter terminals and having their collector-to-emitter current paths serially coupled from a source of operating potential to a reference potential,
means for applying a signal representative of the frequency of said horizontal oscillator to said base terminal on said first transistor,
feedback means coupling said collector terminal on said first transistor to said base terminal on said second transistor,
a source of horizontal synchronization pulses,
a keying transistor having base, collector, and emitter terminals, said base terminal coupled to said source of synchronization pulses and said emitter terminal coupled to a reference potential,
a first diode coupled from said collector terminal on said keying transistor to said collector terminal on said first transistor,
a second diode coupled from said collector terminal on said keying transistor to said collector terminal on said first transistor,
a second diode coupled from said collector terminal on said keying transistor to said base terminal on said first transistor, said first and second diodes poled to conduct collector current in said keying transistor, and output circuit means coupled from the junction of said emitter terminal on said first transistor and said collector terminal on said second transistor.

10. A circuit as defined in claim 9 wherein said signal representative of the frequency of said horizontal oscillator includes an average voltage level which serves as the voltage source for said keying transistor and as the biasing supply for said first transistor.

* * * * *

UNITED STATES PATENT OFFICE
CERTIFICATE OF CORRECTION

Patent No. 3,641,258 Dated February 8, 1972

Inventor(x) Steven Alan Steckler

It is certified that error appears in the above-identified patent and that said Letters Patent are hereby corrected as shown below:

Column 4, line 5, delete "a negative keying pulse is" (first occurrence). Column 5, line 18, delete the entire line, "tends to reduce the base voltage on transistor 60 which also". Column 6, lines 69-71 should be deleted.

Signed and sealed this 3rd day of October 1972.

(SEAL)
Attest:

EDWARD M.FLETCHER,JR.
Attesting Officer

ROBERT GOTTSCHALK
Commissioner of Patents

FORM PO-1050 (10-69)
3530 6/72

USCOMM-DC 60376-P69
U.S. GOVERNMENT PRINTING OFFICE 1969 O-366-334